United States Patent
Hayama

(10) Patent No.: US 8,909,429 B2
(45) Date of Patent: Dec. 9, 2014

(54) VEHICLE STEERING SYSTEM

(71) Applicant: JTEKT Corporation, Osaka-shi (JP)

(72) Inventor: Ryouhei Hayama, Nabari (JP)

(73) Assignee: JTEKT Corporation, Osaka (JP)

( * ) Notice: Subject to any disclaimer, the term of this patent is extended or adjusted under 35 U.S.C. 154(b) by 0 days.

(21) Appl. No.: 13/684,329

(22) Filed: Nov. 23, 2012

(65) Prior Publication Data

US 2013/0138300 A1 May 30, 2013

(30) Foreign Application Priority Data

Nov. 30, 2011 (JP) ................. 2011-262348

(51) Int. Cl.
| | |
|---|---|
| *G05D 1/00* | (2006.01) |
| *G06F 7/00* | (2006.01) |
| *B62D 5/04* | (2006.01) |
| *B62D 6/00* | (2006.01) |
| *B62D 5/00* | (2006.01) |

(52) U.S. Cl.
CPC *B62D 6/00* (2013.01); *B62D 5/046* (2013.01); *B62D 5/049* (2013.01); *B62D 5/001* (2013.01)
USPC .......................................................... 701/43

(58) Field of Classification Search
CPC .......... B62D 6/00; B62D 5/001; B62D 5/049; B62D 5/00
USPC ........................................................... 701/43
See application file for complete search history.

(56) References Cited

U.S. PATENT DOCUMENTS

| | | | | |
|---|---|---|---|---|
| 5,631,529 | A * | 5/1997 | Shimizu et al. | 318/432 |
| 6,032,756 | A * | 3/2000 | Nishimura et al. | 180/446 |
| 6,244,373 | B1 * | 6/2001 | Kojo et al. | 180/443 |
| 6,459,971 | B1 * | 10/2002 | Kurishige et al. | 701/41 |
| 6,543,570 | B2 * | 4/2003 | Parker | 180/446 |
| 6,779,626 | B2 * | 8/2004 | Matsuoka et al. | 180/446 |
| 6,795,762 | B2 * | 9/2004 | Itoh et al. | 701/43 |
| 6,838,846 | B2 * | 1/2005 | Matsuoka | 318/432 |
| 6,906,492 | B2 * | 6/2005 | Matsushita | 318/727 |
| 8,022,651 | B2 * | 9/2011 | Kifuku | 318/434 |
| 2007/0225885 | A1 * | 9/2007 | Hara et al. | 701/43 |
| 2008/0065294 | A1 * | 3/2008 | Katrak et al. | 701/43 |
| 2008/0066994 | A1 * | 3/2008 | Fujita et al. | 180/446 |
| 2008/0294313 | A1 * | 11/2008 | Aoki et al. | 701/43 |

FOREIGN PATENT DOCUMENTS

JP  A-2010-11542  1/2010

* cited by examiner

*Primary Examiner* — Mary Cheung
*Assistant Examiner* — Frederick Brushaber
(74) *Attorney, Agent, or Firm* — Oliff PLC

(57) ABSTRACT

In a vehicle steering system, when a sensor malfunction determination unit detects a malfunction of a rotation angle sensor, the sensor malfunction determination unit changes a control mode from a first control mode to a second control mode. In the second control mode, an actual rotor angle (mechanical angle) ($\theta_{SM}$) of a steered system motor is computed on the basis of a second rotor angle (electric angle) ($\theta_{SE2}$) estimated by a rotation angle estimation unit. Then, feedback control is executed such that the actual rotor angle ($\theta_{SM}$) converges to a target rotor angle ($\theta_{SM1}^*$) that is obtained by superimposing a rotation maintaining command signal on a target rotor angle ($\theta_{SM}^*$) computed by a target rotor angle computation unit.

5 Claims, 6 Drawing Sheets

VEHICLE STEERING SYSTEM

INCORPORATION BY REFERENCE

The disclosure of Japanese Patent Application No. 2011-262348 filed on Nov. 30, 2011 including the specification, drawings and abstract, is incorporated herein by reference in its entirety.

BACKGROUND OF THE INVENTION

1. Field of the Invention

The invention relates to a vehicle steering system in which an operating member that is operated for steering is not mechanically coupled to a steering mechanism and the steering mechanism is driven by a steered system motor.

2. Description of Related Art

There has been suggested a steer-by-wire system in which a steering wheel that serves as an operating member is not mechanically coupled to a steering mechanism, a steering angle of the steering wheel is detected by an angle sensor, and the driving force of a steered system motor that is controlled on the basis of an output from the angle sensor is transmitted to the steering mechanism. In the steer-by-wire system, because there is no mechanical coupling between the steering wheel and the steering mechanism, it is possible to prevent upthrust of the steering wheel in the event of a collision of a vehicle, and it is also possible to simplify the configuration of the steering mechanism and reduce the weight of the steering mechanism. In addition, the flexibility in arrangement of the steering wheel increases, and, furthermore, a lever, a pedal, or the like, may be used as the operating member instead of the steering wheel.

In the steer-by-wire system, the steering wheel and the steering mechanism are not mechanically coupled to each other. Therefore, if a malfunction occurs in electrical devices such as the steered system motor and sensors necessary to control the steered system motor, it is not possible to execute steering control. When the steered system motor is formed of a brushless motor, the sensors necessary to control the steered system motor include a rotation angle sensor used to detect the rotation angle of the steered system motor.

Therefore, there is suggested the following steer-by-wire system in which electrical devices such as steered system motors and sensors are provided. In the steer-by-wire system, each kind of electrical device is provided in plurality, and when a malfunction occurs in one of the electrical devices, another electrical device of the same kind with no malfunction is used instead of the malfunctioning electrical device, thereby avoiding the situation where steering is disabled. However, this configuration results in a cost increase because each kind of electrical device needs to be provided in plurality.

SUMMARY OF THE INVENTION

It is an object of the invention to provide a vehicle steering system that, even when a malfunction occurs in a rotation angle sensor used to detect the rotation angle of a steered system motor, is able to execute steering control without using another rotation angle sensor used to detect the rotation angle of the steered system motor.

An aspect of the invention relates to a vehicle steering system in which an operating member that is operated for steering is not mechanically coupled to a steering mechanism and the steering mechanism is driven by a steered system motor formed of a brushless motor. The vehicle steering system includes: a rotation angle sensor used to detect a rotation angle of a rotor of the steered system motor; a rotor angle estimator that estimates the rotation angle of the rotor of the steered system motor based on an induced voltage of the steered system motor; a target rotor angle computation unit that computes a target rotor angle ($\theta_{SM}^*$) that is a target value of the rotation angle of the rotor of the steered system motor based on a steering state; a signal superimposing unit used to superimpose a rotation maintaining command signal for continuously rotating the steered system motor on the target rotor angle computed by the target rotor angle computation unit; a malfunction detector that detects occurrence of a malfunction of the rotation angle sensor; and a selector. When a malfunction of the rotation angle sensor is detected by the malfunction detector, the selector changes a control mode from a first control mode, in which the steered system motor is controlled based on the target rotor angle computed by the target rotor angle computation unit or the target rotor angle on which the rotation maintaining command signal has been superimposed by the signal superimposing unit and a value detected by the rotation angle sensor, to a second control mode, in which the steered system motor is controlled based on the target rotor angle on which the rotation maintaining command signal has been superimposed by the signal superimposing unit and the rotation angle of the rotor, which is estimated by the rotor angle estimator.

With this configuration, when a malfunction of the rotation angle sensor has not been detected, motor control is executed in the first control mode. That is, the steered system motor is controlled on the basis of the target rotor angle computed by the target rotor angle computation unit or the target rotor angle on which the rotation maintaining command signal has been superimposed by the signal superimposing unit and the value detected by the rotation angle sensor.

On the other hand, when a malfunction of the rotation angle sensor is detected, motor control is executed in the second control mode. That is, the steered system motor is controlled on the basis of the target rotor angle on which the rotation maintaining command signal has been superimposed by the signal superimposing unit and the rotation angle of the rotor, which is estimated by the rotor angle estimator. The rotor angle estimator estimates the rotation angle of the rotor of the steered system motor on the basis of the induced voltage of the steered system motor. Therefore, in order to estimate the rotation angle of the rotor with the use of the rotor angle estimator, the steered system motor needs to be rotating. In the second control mode, because it is possible to continuously rotate the steered system motor irrespective of the target rotor angle computed by the target rotor angle computation unit, it is always possible to estimate the rotation angle of the rotor with the use of the rotor angle estimator. As a result, even when a malfunction occurs in the rotation angle sensor, it is possible to execute steering control based on a steering state without using another rotation angle sensor used to detect the rotation angle of the steered system motor.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
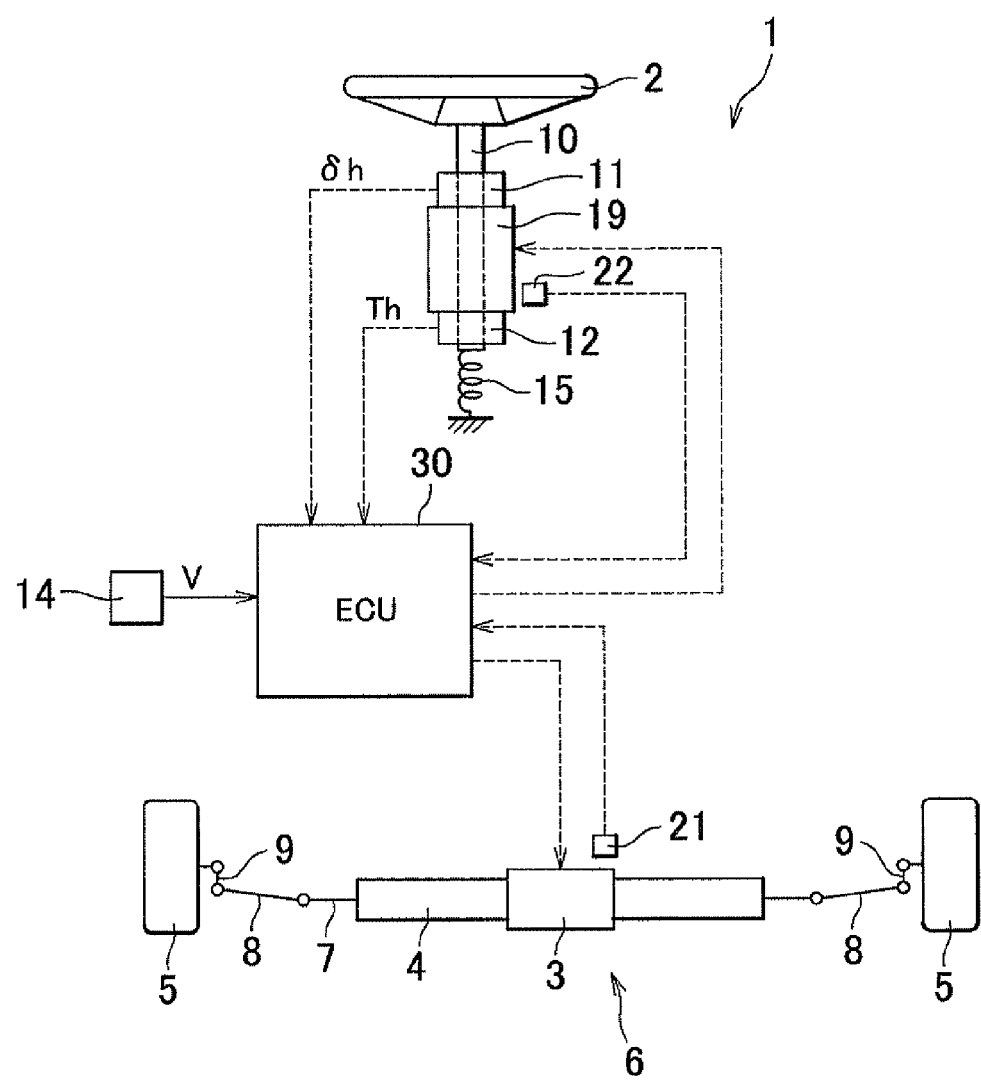
FIG. 1 is a view that illustrates the configuration of a vehicle steering system according to an embodiment of the invention.

Hereinafter, an embodiment of the invention will be described with reference to the accompanying drawings. FIG. 1 shows the configuration of a steer-by-wire system. A vehicle steering system 1 includes a steering wheel 2, a steered system motor 3 and a steering gear 4. The steering wheel 2 is an operating member that is operated by a driver to steer a vehicle. The steered system motor 3 is driven in response to a rotational operation of the steering wheel 2. The steering gear 4 transmits the driving force of the steered system motor 3 to right and left front wheels 5 that serve as steered wheels. Between the steering wheel 2 and a steering mechanism 6 that includes, for example, the steered system motor 3, there is no mechanical coupling via which steering torque applied to the steering wheel 2 is mechanically transmitted to the steering mechanism 6. The wheels 5 are steered by executing drive control of the steered system motor 3 on the basis of an operation amount (steering angle or steering torque) of the steering wheel 2.

The steered system motor 3 is formed of a brushless motor. The steered system motor 3 is provided with a rotation angle sensor 21, such as a resolver, used to detect the rotation angle of a rotor of the steered system motor 3. The steering gear 4 has a motion conversion mechanism that converts the rotational motion of an output shaft of the steered system motor 3 into a linear motion (linear motion in the vehicle lateral direction) of a steering rod 7. The movement of the steering rod 7 is transmitted to the wheels 5 via tie rods 8 and knuckle arms 9, and the steered angle of the wheels 5 is changed. That is, the steering mechanism 6 is formed of the steered system motor 3, the steering gear 4, the steering rod 7, the tie rods 8 and the knuckle arms 9. A known steering gear may be used as the steering gear 4, and the configuration of the steering gear 4 is not limited as long as the movement of the steered system motor 3 is transmitted to the wheels 5 such that the steered angle is changed. Note that, wheel alignment is set such that, in a state where the steered system motor 3 is not driven, the wheels 5 are returned to the straight-ahead steering position by the self-alignment torque.

The steering wheel 2 is coupled to a rotary shaft 10 that is rotatably supported on the vehicle body side. A reaction motor 19 is provided on the rotary shaft 10. The reaction motor 19 generates reaction torque (operation reaction force) that acts on the steering wheel 2. The reaction motor 19 is formed of an electric motor, such as a brushless motor, that has an output shaft integrated with the rotary shaft 10. In the present embodiment, the reaction motor 19 is formed of a brushless motor. The reaction motor 19 is provided with a rotation angle sensor 22, such as a resolver, used to detect the rotation angle (rotor angle) of a rotor of the reaction motor 19.

An elastic member 15 is provided between the vehicle body and the rotary shaft 10. The elastic member 15 applies elastic force in such a direction that the steering wheel 2 is returned to the straight-ahead steering position. The elastic member 15 is, for example, formed of a spring that applies elastic force to the rotary shaft 10. When the reaction motor 19 is not applying torque to the rotary shaft 10, the steering wheel 2 returns to the straight-ahead steering position by the elastic force of the elastic member 15.

The vehicle steering system 1 includes an angle sensor 11 that detects the rotation angle of the rotary shaft 10 in order to detect a steering angle (rotation angle) δh of the steering wheel 2. The vehicle steering system 1 includes a torque sensor 12 that is used to detect a torque transmitted by the rotary shaft 10, in order to detect a steering torque Th applied to the steering wheel 2 by a driver. The vehicle steering system 1 includes a speed sensor 14 that detects a vehicle speed V. The angle sensor 11, the torque sensor 12, the speed sensor 14 and the rotation angle sensors 21, 22 are connected to an electronic control unit (ECU) 30. The ECU 30 controls the steered system motor 3 and the reaction motor 19.

Figure 2:
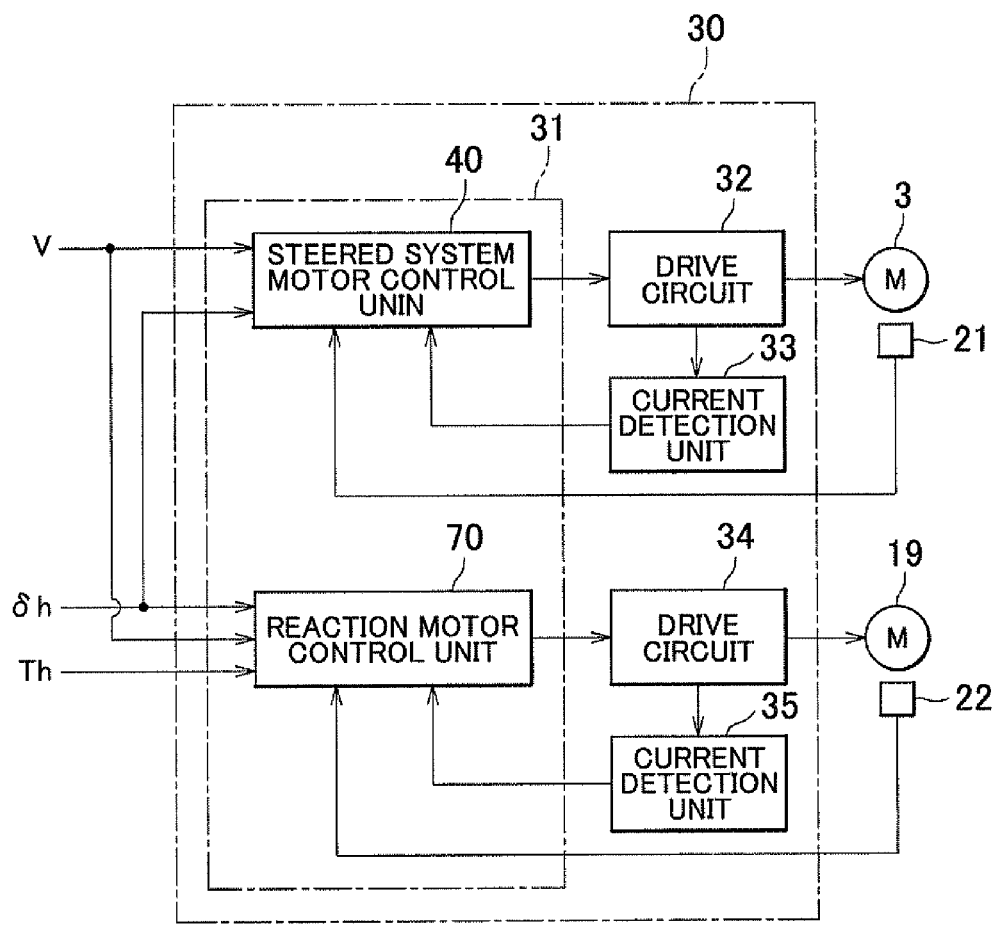
FIG. 2 is a block diagram that shows the electrical configuration of an ECU.

FIG. 2 is a block diagram that shows the electrical configuration of the ECU 30. The ECU 30 includes a microcomputer 31, a drive circuit 32, a current detection unit 33, a drive circuit 34 and a current detection unit 35. The drive circuit 32 is controlled by the microcomputer 31, and supplies electric power to the steered system motor 3. The current detection unit 33 detects motor currents that flow through the steered system motor 3. The drive circuit 34 is controlled by the microcomputer 31, and supplies electric power to the reaction motor 19. The current detection unit 35 detects motor currents that flow through the reaction motor 19.

The microcomputer 31 includes a CPU and memories (e.g. a ROM, a RAM, a nonvolatile memory), and functions as a plurality of functional processing units by executing predetermined programs. The functional processing units include a steered system motor control unit 40 and a reaction motor control unit 70. The steered system motor control unit 40 is used to control the steered system motor 3. The reaction motor control unit 70 is used to control the reaction motor 19.

The steered system motor control unit 40 executes steering control corresponding to a steering state by driving the steered system motor 3 via the drive circuit 32 on the basis of the vehicle speed V detected by the speed sensor 14 and the steering angle δh detected by the angle sensor 11. The reaction motor control unit 70 executes reaction force control corresponding to a steering state by driving the reaction motor 19 via the drive circuit 34 on the basis of the vehicle speed V detected by the speed sensor 14, the steering angle δh detected by the angle sensor 11 and the steering torque Th detected by the torque sensor 12.

The steered system motor 3 is, for example, a three-phase brushless motor. As diagrammatically shown in FIG. 3, the steered system motor 3 includes a rotor 100 and a stator 105. The rotor 100 serves as a field magnet. The stator 105 includes a U-phase stator coil 101, a V-phase stator coil 102 and a W-phase stator coil 103. The steered system motor 3 may be an inner rotor motor in which a stator is arranged radially outward of a rotor such that the stator faces the rotor, or may be an outer rotor motor in which a stator is arranged radially inward of a cylindrical rotor such that the stator faces the rotor.

A three-phase fixed coordinate system (UVW coordinate system) is defined by setting a U-axis, a V-axis and a W-axis in directions of the U-phase stator coil 101, the V-phase stator coil 102 and the W-phase stator coil 103, respectively. In addition, a two-phase rotating coordinate system (dq coordinate system, actual rotating coordinate system) is defined by setting a d-axis (magnetic pole axis) in a magnetic pole direction of the rotor 100 and setting a q-axis (torque axis) in a direction that is at right angles to the d-axis within a rotation plane of the rotor 100. The dq coordinate system is a rotating coordinate system that rotates together with the rotor 100. In the dq coordinate system, only a q-axis current contributes to generation of torque of the rotor 100. Therefore, a d-axis current may be set to zero and the q-axis current may be controlled on the basis of a required torque. A rotor angle (electric angle) $\theta_{-SE}$ that is the rotation angle of the rotor 100 is a rotation angle of the d-axis with respect to the U-axis. The dq coordinate system is an actual rotating coordinate system that rotates in accordance with the rotor angle $\theta_{-SE}$. By using the rotor angle $\theta_{-SE}$, it is possible to execute coordinate conversion between the UVW coordinate system and the dq coordinate system.

Figure 4:
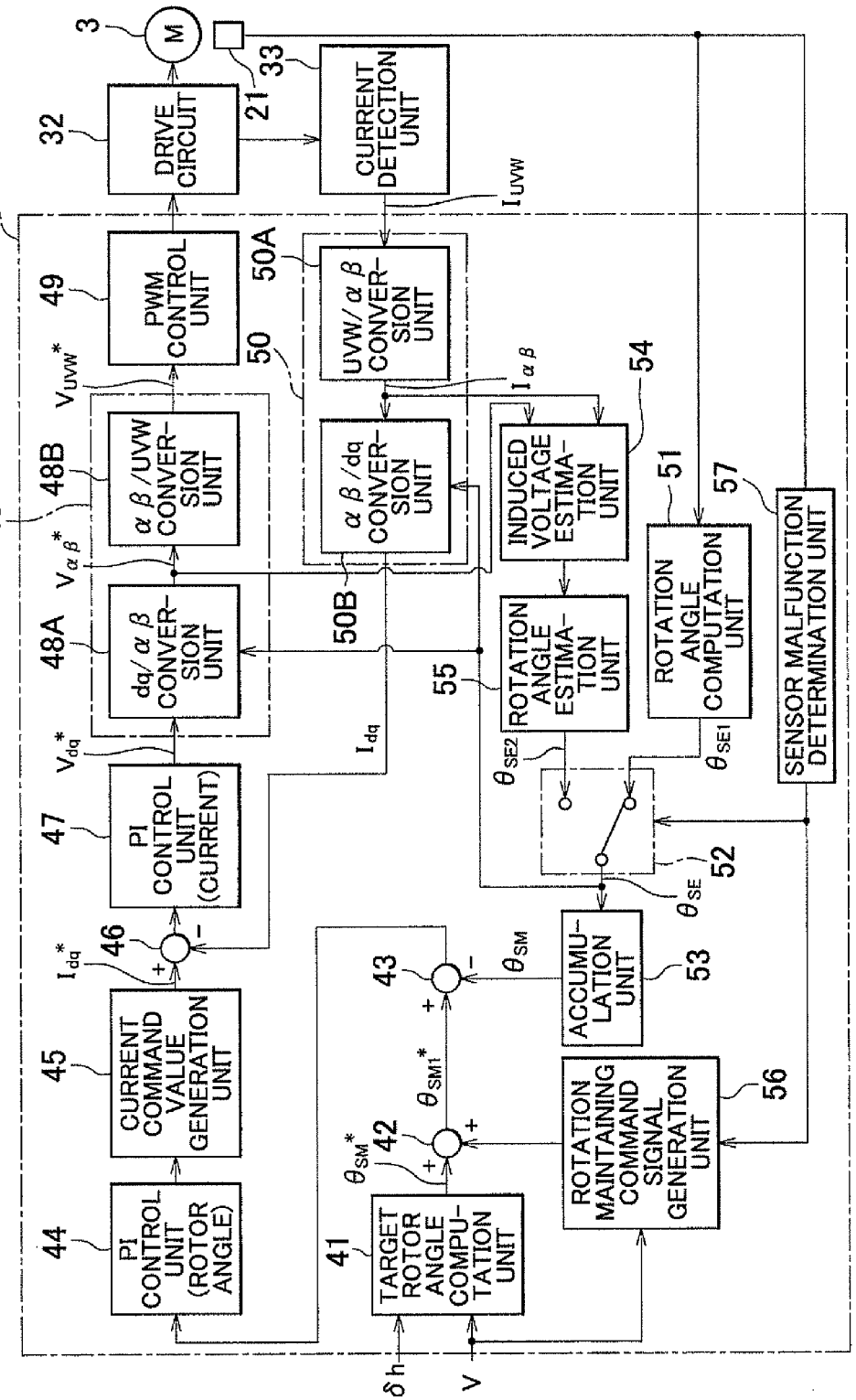
FIG. 4 is a block diagram that shows the configuration of a steered system motor control unit.

The reaction motor 19 is formed of, for example, a three-phase brushless motor, and has a structure similar to that of the steered system motor 3. FIG. 4 is a block diagram that shows the configuration of the steered system motor control unit 40. The steered system motor control unit 40 includes a target rotor angle computation unit 41, an addition unit 42, an angle deviation computation unit 43, a proportional-integral (PI) control unit 44, a current command value generation unit 45, a current deviation computation unit 46, a proportional-integral (PI) control unit 47, a dq/UVW conversion unit 48, a pulse width modulation (PWM) control unit 49, a UVW/dq conversion unit 50, a rotation angle computation unit 51, an angle changing unit 52, an accumulation unit 53, an induced voltage estimation unit 54, a rotation angle estimation unit 55, a rotation maintaining command signal generation unit 56 and a sensor malfunction determination unit 57.

In order to control the steered system motor 3 formed of the three-phase brushless motor, it is necessary to detect the rotation angle of the rotor (rotor angle) of the steered system motor 3. Therefore, the rotation angle sensor 21, such as a resolver, is provided in order to detect the rotor angle of the steered system motor 3. If a malfunction occurs in the rotation angle sensor 21, it is not possible to detect the rotor angle of the steered system motor 3. Therefore, in the present embodiment, if a malfunction occurs in the rotation angle sensor 21, an induced voltage generated due to the rotation of the steered system motor 3 is estimated, and the rotor angle of the steered system motor 3 is estimated on the basis of the estimated induced voltage. For this purpose, the induced voltage estimation unit 54 and the rotation angle estimation unit 55 are provided. If a malfunction occurs in the rotation angle sensor 21, the steered system motor 3 is controlled using the rotor angle estimated by the rotation angle estimation unit 55.

In order to estimate an induced voltage, the steered system motor 3 needs to be rotating. Therefore, in the present embodiment, when a malfunction occurs in the rotation angle sensor 21, a rotation maintaining command signal for continuously rotating the steered system motor 3 is superimposed on a target rotor angle of the steered system motor 3. For this purpose, the rotation maintaining command signal generation unit 56 and the addition unit 42 are provided.

Hereinafter, the units of the steered system motor control unit 40 will be described. The rotation angle computation unit 51 computes the rotation angle of the rotor of the steered system motor 3 (electric angle; hereinafter, referred to as "first rotor angle $\theta_{SE1}$") on the basis of a signal output from the rotation angle sensor 21. The induced voltage estimation unit 54 estimates an induced voltage generated due to the rotation of the steered system motor 3. The rotation angle estimation unit 55 estimates the rotation angle of the rotor of the steered system motor 3 (electric angle; hereinafter, referred to as "second rotor angle $\theta_{SE2}$") on the basis of the induced voltage estimated by the induced voltage estimation unit 54. The details of operations of the induced voltage estimation unit 54 and rotation angle estimation unit 55 will be described later.

The angle changing unit 52 selects one of the first rotor angle $\theta_{SE1}$ computed by the rotation angle computation unit 51 and the second rotor angle $\theta_{SE2}$ estimated by the rotation angle estimation unit 55, and outputs the selected rotor angle as a rotor angle (electric angle) $\theta_{SE}$. The accumulation unit 53 computes an absolute rotation angle of the rotor of the steered system motor 3 (mechanical angle; hereinafter, referred to as "actual rotor angle $\theta_{SM}$") by accumulating the rotor angle (electric angle) $\theta_{SE}$ output from the angle changing unit 52.

The sensor malfunction determination unit 57 determines whether there is a malfunction in the rotation angle sensor 21, and changes the control mode of the steered system motor 3 on the basis of the result of determination. That is, the sensor malfunction determination unit 57 functions as a malfunction detector and a selector. For example, the sensor malfunction determination unit 57 is able to detect a malfunction of the rotation angle sensor 21, a break of a signal line of the rotation angle sensor 21 and a ground fault of the signal line of the rotation angle sensor 21, by monitoring a signal output from the rotation angle sensor 21. The sensor malfunction determination unit 57 changes the control mode between a first control mode and a second control mode on the basis of the result of determination as to whether there is a malfunction in the rotation angle sensor 21, and generates a mode changing command. The control mode is changed by the angle changing unit 52 on the basis of the mode changing command.

Specifically, the sensor malfunction determination unit 57 sets the control mode to the first control mode "in normal times", that is, when it is determined that there is no malfunction in the rotation angle sensor 21. On the other hand, "in the event of a malfunction", that is, when it is determined that there is a malfunction in the rotation angle sensor 21, the sensor malfunction determination unit 57 changes the control mode from the first control mode to the second control mode. In the first control mode, the angle changing unit 52 selects the first rotor angle $\theta_{SE1}$ and outputs the first rotor angle $\theta_{SE1}$ as the rotor angle $\theta_{SE}$. On the other hand, in the second control mode, the angle changing unit 52 selects the second rotor angle $\theta_{SE2}$ and outputs the second rotor angle $\theta_{SE2}$ as the rotor angle $\theta_{SE}$.

The mode changing command from the sensor malfunction determination unit 57 is also provided to the rotation maintaining command signal generation unit 56. The rotation maintaining command signal generation unit 56 sets the rotation maintaining command signal to zero in the first control mode. When the mode changing command from the sensor malfunction determination unit 57 is a command to change the control mode from the first control mode to the second control mode, the rotation maintaining command signal generation unit 56 generates the rotation maintaining command signal (significant value) in response to the command. A method of calculating the rotation maintaining command signal will be described later.

The target rotor angle computation unit 41 computes a target rotor angle (mechanical angle) $\theta_{SM}*$ that is a target value of the rotor angle (mechanical angle) of the steered system motor 3 on the basis of the vehicle speed V detected by the speed sensor 14 and the steering angle $\delta h$ detected by the angle sensor 11. For example, the target rotor angle computation unit 41 sets the target rotor angle $\theta_{SM}*$ corresponding to the steering angle $\delta h$ and the vehicle speed V using a predetermined transfer function $K\delta(V)$.

The addition unit 42 computes a final target rotor angle $\theta_{SN1}^*$ (mechanical angle) by adding (superimposing) the rotation maintaining command signal generated by the rotation maintaining command signal generation unit 56 to (on) the target rotor angle $\theta_{SM}^*$ computed by the target rotor angle computation unit 41. The angle deviation computation unit 43 computes a deviation between the final target rotor angle $\theta_{SM1}^*$ computed by the addition unit 42 and the actual rotor angle $\theta_{SM}$ computed by the accumulation unit 53. The PT control unit 44 executes PI computation on the angular deviation computed by the angle deviation computation unit 43.

The current command value generation unit 45 generates values of currents that should be supplied to coordinate axes of the dq coordinate system, as current command values, on the basis of the result of computation executed by the PT control unit 44. Specifically, the current command value generation unit 45 generates a d-axis current command value $I_d^*$ and a q-axis current command value $I_q^*$ (hereinafter, collectively referred to as "two-phase current command values $I_{dq}^*$") where appropriate). The current command value generation unit 45 sets the q-axis current command value $I_q^*$ to a significant value, and sets the d-axis current command value $I_d^*$ to zero. More specifically, the current command value generation unit 45 generates the q-axis current command value $I_q^*$ on the basis of the result of computation executed by the PI control unit 44. The two-phase current command values $I_{dq}$ generated by the current command value generation unit 45 are provided to the current deviation computation unit 46.

Figure 3:
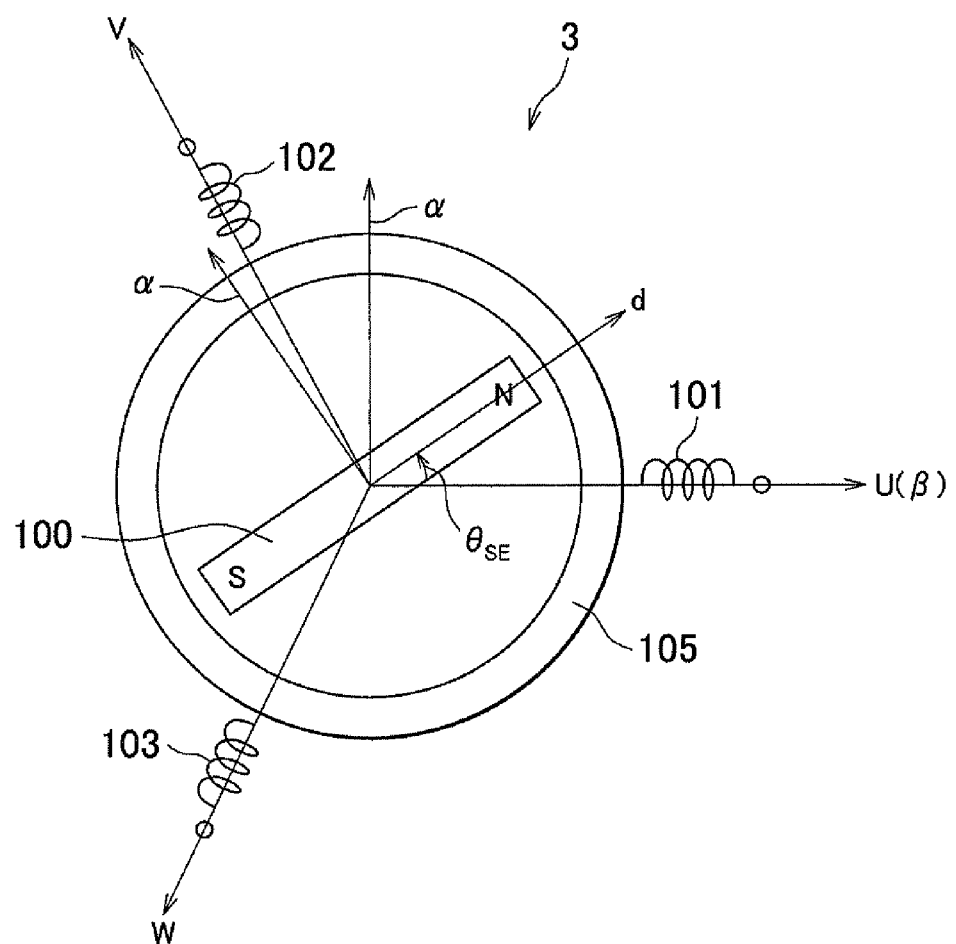
FIG. 3 is a view for illustrating the configuration of a steered system motor.

The current detection unit 33 detects a U-phase current $I_U$, V-phase current $I_V$ and W-phase current $I_W$ of the steered system motor 3 (hereinafter, collectively referred to as "three-phase detected currents $I_{UVW}$" where appropriate). The three-phase detected currents $I_{UVW}$ detected by the current detection unit 33 are provided to the UVW/dq conversion unit 50. The UVW/dq conversion unit 50 includes a UVW/αβ conversion unit 50A and an αβ/dq conversion unit 50B. The UVW/αβ conversion unit 50A converts the three-phase detected currents $I_{UVW}$ of the UVW coordinate system, detected by the current detection unit 33, into two-phase detected currents $I_\alpha$ and $I_\beta$ (hereinafter, collectively referred to as "two-phase detected currents $I_{\alpha\beta}$" where appropriate) of the αβ coordinate system that is the two-phase fixed coordinate system. As shown in FIG. 3, the αβ coordinate system is a fixed coordinate system in which the rotation center of the rotor 100 is set as an origin and an α axis and a β axis (in the example in FIG. 3, the β axis coincides with the U-axis) perpendicular to the α axis are defined within a rotation plane of the rotor 100. The αβ/dq conversion unit 50B converts the two-phase detected currents $I_{\alpha\beta}$ into two-phase detected currents $I_d$ and $I_q$ of the dp coordinate system (hereinafter, collectively referred to as "two-phase detected currents $I_{dq}$" where appropriate). The two-phase detected currents $I_{dq}$ are provided to the current deviation computation unit 46. The rotor angle $\theta_{SE}$ selected by the angle changing unit 52 is used for coordinate conversion executed by the αβ/dq conversion unit 50B.

The current deviation computation unit 46 computes a deviation between the two-phase current command values $I_{dq}^*$ generated by the current command value generation unit 45 and the two-phase detected currents $I_{dq}$ provided from the αβ/dq conversion unit 50B. The current deviation computation unit 46 computes a deviation of the d-axis detected current $I_d$ from the d-axis current command value $I_d^*$ and a deviation of the q-axis detected current $I_q$ from the q-axis current command value $I_q^*$. The deviations are provided to the PI control unit 47.

The PI control unit 47 generates two-phase voltage command values $V_{dq}^*$ (a d-axis voltage command value $V_d^*$ and a q-axis voltage command value $V_q^*$), which are values of voltages that should be applied to the steered system motor 3, by executing PI computation on the current deviations computed by the current deviation computation unit 46. The two-phase voltage command values $V_{dq}^*$ are provided to the dq/UVW conversion unit 48. The dq/UVW conversion unit 48 includes a dq/αβ conversion unit 48A and an αβ/UVW conversion unit 48B. The dq/αβ conversion unit 48A converts the two-phase voltage command values $V_{dq}^*$ into two-phase voltage command values $V_{\alpha\beta}^*$ of the αβ coordinate system. The rotor angle $\theta_{SE}$ selected by the angle changing unit 52 is used for the coordinate conversion. The two-phase voltage command values $V_{\alpha\beta}^*$ are formed of an α-axis voltage command value $V_\alpha^*$ and a β-axis voltage command value $V_\beta^*$.

The αβ/UVW conversion unit 48B generates three-phase voltage command values $V_{UVW}^*$ by executing coordinate conversion computation on the two-phase voltage command values $V_{\alpha\beta}^*$. The three-phase voltage command values $V_{UVW}^*$ are formed of a U-phase voltage command value $V_U^*$, a V-phase voltage command value $V_V^*$ and a W-phase voltage command value $V_W^*$. The three-phase voltage command values $V_{UVW}^*$ are provided to the PWM control unit 49. The PWM control unit 49 generates a U-phase PWM control signal, a V-phase PWM control signal and a W-phase PWM control signal having duty ratios that correspond to the U-phase voltage command value $V_U^*$, the V-phase voltage command value $V_V^*$ and the W-phase voltage command value $V_W^*$, respectively, and supplies the U-phase PWM control signal, the V-phase PWM control signal and the W-phase PWM control signal to the drive circuit 32.

The drive circuit 32 is formed of a three-phase (corresponding to a U-phase, a V-phase and a W-phase) inverter circuit. Power elements that constitute the inverter circuit are controlled by the PWM control signals provided from the PWM control unit 49. Thus, voltages that correspond to the three-phase voltage command values $V_{UVW}^*$ are applied to the respective phase stator coils 101, 102 and 103 of the steered system motor 3. The angle deviation computation unit 43 and the PI control unit 44 constitute an angle feedback controller. Due to the function of the angle feedback controller, the actual rotor angle $\theta_{SM}$ of the steered system motor 3 is controlled so as to approach the target rotor angle $\theta_{SM1}^*$. The current deviation computation unit 46 and the PI control unit 47 constitute a current feedback controller. Due to the function of the current feedback controller, motor currents that flow through the steered system motor 3 are controlled so as to approach the two-phase current command values $I_{dq}^*$ generated by the current command value generation unit 45.

The operation of the rotation maintaining command signal generation unit 56 will be described. A rotation maintaining command signal generated by the rotation maintaining command signal generation unit 56 is a sinusoidal signal in the present embodiment, and is expressed by Equation 1 indicated below.

$$\text{Rotation maintaining command signal} = K(V) \cdot \sin(2\pi \cdot \alpha(V) \cdot t) \quad \text{Equation 1}$$

K(V) is an amplitude control value for setting the amplitude of the rotation maintaining command signal. α(V) is a frequency control value for setting the frequency of the rotation maintaining command signal. t is a time.

If the target rotor angle computed by the target rotor angle computation unit 41 is $\theta_{SM}^*$, the final target rotor angle $\theta_{SM1}^*$ computed by the addition unit 42 is expressed by Equation 1 indicated below.

$$\theta_{SM1}{}^* = \theta_{SM}{}^* + K(V) \cdot \sin(2\pi \cdot \alpha(V) \cdot t) \quad \text{Equation 2}$$

In the first control mode that is the control mode selected in normal times, the rotation maintaining command signal generation unit 56 sets the amplitude control value K(V) to zero. Thus, in the first control mode, the rotation maintaining command signal is zero, and therefore the final target rotor angle $\theta_{SM1}{}^*$ is equal to the target rotor angle $\theta_{SM}{}^*$ computed by the target rotor angle computation unit 41.

In the second control mode that is the control mode selected in the event of a malfunction, the rotation maintaining command signal generation unit 56 sets the amplitude control value K(V) to a significant value corresponding to the vehicle speed V, and sets the frequency control value α(V) to a significant value corresponding to the vehicle speed V. The rotation maintaining command signal is superimposed on the target rotor angle $\theta_{SM}{}^*$ in order to continuously rotate the steered system motor 3. However, in order to prevent the driver from feeling a sense of discomfort, the amplitude control value K(V) is set to a small value (for example, 3π/20<K(V)<16π/20). In addition, the frequency control value α(V) is set to, for example, a value within a range larger than 0.3 and smaller than 2.0 (0.3<α(V)<2.0).

The amplitude control value K(V) and the frequency control value α(V) are set so as to be smaller as the vehicle speed V becomes higher. As the vehicle speed V becomes higher, the amplitude of the rotation maintaining command signal becomes smaller, and the rotation maintaining command signal changes more moderately. Therefore, when the vehicle speed V is high, the amount of change in the steered angle of the wheels 5 based on the rotation maintaining command signal is small. As a result, stability of steering is ensured. In the second control mode, the final target rotor angle $\theta_{SM1}{}^*$ is a value obtained by superimposing the rotation maintaining command signal calculated as described above on the target rotor angle $\theta_{SM}{}^*$ computed by the target rotor angle computation unit 41.

Figure 5:
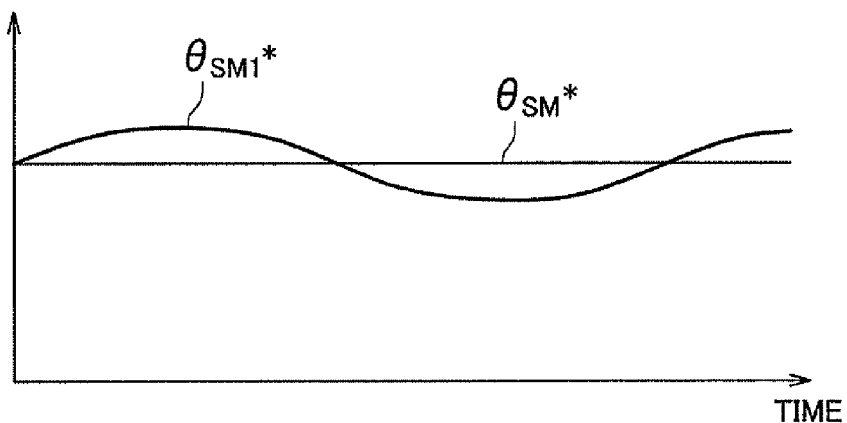
FIG. 5 is a time chart that shows an example of changes in a target rotor angle $\theta_{SM}^*$ and a final target rotor angle $\theta_{SM1}^*$ in a second control mode.

FIG. 5 is a time chart that shows an example of changes in the target rotor angle $\theta_{SM}{}^*$ and the final target rotor angle $\theta_{SM1}{}^*$ in the second control mode. As shown in FIG. 5, even in a state where the target rotor angle $\theta_{SM}{}^*$ computed by the target rotor angle computation unit 41 remains unchanged, for example, in a retained state, the final target rotor angle $\theta_{W1}{}^*$ periodically changes. Therefore, the steered system motor 3 is rotated alternately in the forward direction and in the reverse direction. Therefore, even when the driver is not rotating the steering wheel 2, it is possible to estimate the rotor angle of the steered system motor 3 with the use of the induced voltage estimation unit 54 and the rotation angle estimation unit 55.

Figure 6:
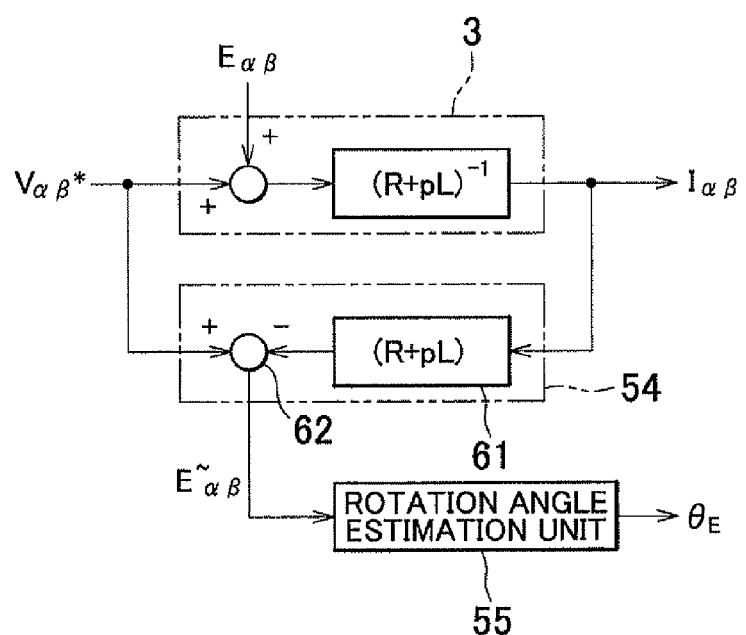
FIG. 6 is a block diagram for illustrating the configuration of an induced voltage estimation unit.

FIG. 6 is a block diagram for illustrating the configuration of the induced voltage estimation unit 54. The induced voltage estimation unit 54 estimates the induced voltage of the steered system motor 3 on the basis of the two-phase detected currents $I_{\alpha\beta}$ and the two-phase voltage command values $V_{\alpha\beta}{}^*$. The induced voltage estimation unit 54 serves as a disturbance observer that estimates the induced voltage of the steered system motor 3 as a disturbance on the basis of a motor model that is a mathematical model of the steered system motor 3. The motor model may be expressed, for example, as $(R+pL)^{-1}$. Here, R is an armature coil resistance, L is αβ-axis inductances, and p is a differential operator. It is considered that the two-phase voltage command values $V_{\alpha\beta}{}^*$ and the induced voltages $E_{\alpha\beta}$ (an α-axis induced voltage $E_\alpha$ and a β-axis induced voltage $E_\beta$) are applied to the steered system motor 3.

The induced voltage estimation unit 54 may be formed of an inverse motor model (inverse model of the motor model) 61 and a voltage deviation computation unit 62. The inverse motor model 61 receives the two-phase detected currents $I_{\alpha\beta}$ and estimates motor voltages. The voltage deviation computation unit 62 obtains deviations between the motor voltages estimated by the inverse motor model 61 and the two-phase voltage command values $V_{\alpha\beta}{}^*$. The voltage deviation computation unit 62 obtains disturbances for the two-phase voltage command values $V_{\alpha\beta}{}^*$. As is apparent from FIG. 6, the disturbances are estimated values $\hat{E}_{\alpha\beta}$ (an α-axis induced voltage estimated value $\hat{E}_\alpha$ and a β-axis induced voltage estimated value $\hat{E}_\beta$ (hereinafter, correctively referred to as estimated induced voltages $\hat{E}_{\alpha\beta}$)) that correspond to the induced voltages $E_{\alpha\beta}$. The inverse motor model 61 is expressed by, for example, R+pL.

The induced voltages $E_\alpha$ may be expressed by Equation 3 indicated below. Note that $K_E$ is an induced voltage constant, $\theta_{SE}$ is a rotor angle and ω is a rotor rotation angular velocity.

$$E_{\alpha\beta} = \begin{bmatrix} E_\alpha \\ E_\beta \end{bmatrix} = \begin{bmatrix} -K_E \omega \sin\theta_{SE} \\ K_E \omega \cos\theta_{SE} \end{bmatrix} \quad \text{Equation 3}$$

Therefore, when the estimated induced voltages $\hat{E}_{\alpha\beta}$ are obtained, an estimated rotation angle $\theta_{SE2}$ is obtained according to Equation 4 indicated below. This computation is executed by the rotation angle estimation unit 55.

$$\theta_{SE2} = \tan^{-1} \frac{-\hat{E}_\alpha}{\hat{E}_\beta} \quad \text{Equation 4}$$

In the first control mode, the actual rotor angle (mechanical angle) $\theta_{SM}$ of the steered system motor 3 is computed on the basis of the first rotor angle (electric angle) $\theta_{SE1}$ (=$\theta_{SE}$ computed on the basis of the signal output from the rotation angle sensor 21. Then, feedback control is executed such that the actual rotor angle $\theta_{SM}$ converges to the target rotor angle $\theta_{SM}{}^*$ (=$\theta_{SM1}{}^*$) computed by the target rotor angle computation unit 41. In addition, coordinate conversion by the dq/αβ conversion unit 48A and coordinate conversion by the αβ/dq conversion unit 50B are executed using the first rotor angle $\theta_{SE1}$ ($\theta_{SE}$) computed on the basis of the signal output from the rotation angle sensor 21. That is, in the first control mode, the steered system motor 3 is controlled using the value detected by the rotation angle sensor 21 and the target rotor angle $\theta_{SM}{}^*$ (=$\theta_{SM1}{}^*$) computed by the target rotor angle computation unit 41. Thus, steering control corresponding to the steering state is executed.

On the other hand, in the second control mode, the actual rotor angle (mechanical angle) $\theta_{SM}$ of the steered system motor 3 is computed on the basis of the second rotor angle (electric angle) $\theta_{SE2}$ (=$\theta_{SE}$) estimated by the rotation angle estimation unit 55. Then, feedback control is executed such that the actual rotor angle $\theta_{SM}$ converges to the target rotor angle $\theta_{SM1}{}^*$ obtained by superimposing the rotation maintaining command signal on the target rotor angle $\theta_{SM}{}^*$ computed by the target rotor angle computation unit 41. In addition, coordinate conversion by the dq/αβ conversion unit 48A and coordinate conversion by the αβ/dq conversion unit 50B are executed using the second rotor angle $\theta_{SE2}$ (=$\theta_{SE}$) estimated by the rotation angle estimation unit 55.

In the second control mode, the steered system motor 3 is controlled using the rotor angle $\theta_{SE2}$ estimated by the rotation angle estimation unit 55 and the target rotor angle $\theta_{SM1}{}^*$ obtained by superimposing the rotation maintaining command signal on the target rotor angle $\theta_{SM}{}^*$ computed by the target rotor angle computation unit 41. Therefore, it is possible to continuously rotate the steered system motor 3 irrespective of the target rotor angle $\theta_{SM}{}^*$ computed by the target rotor angle computation unit 41. Accordingly, it is always possible to estimate the rotor angle $\theta_{SE2}$ with the use of the induced voltage estimation unit 54 and the rotation angle estimation unit 55. As a result, even when a malfunction occurs in the rotation angle sensor 21, it is possible to appropriately execute steering control corresponding a steering state without using another rotation angle sensor for detecting the rotor angle of the steered system motor 3. In addition, the rotation maintaining command signal is a sinusoidal signal, and has a small amplitude. Therefore, it is possible to suppress occurrence of the situation where the driver feels a sense of discomfort.

Figure 7:
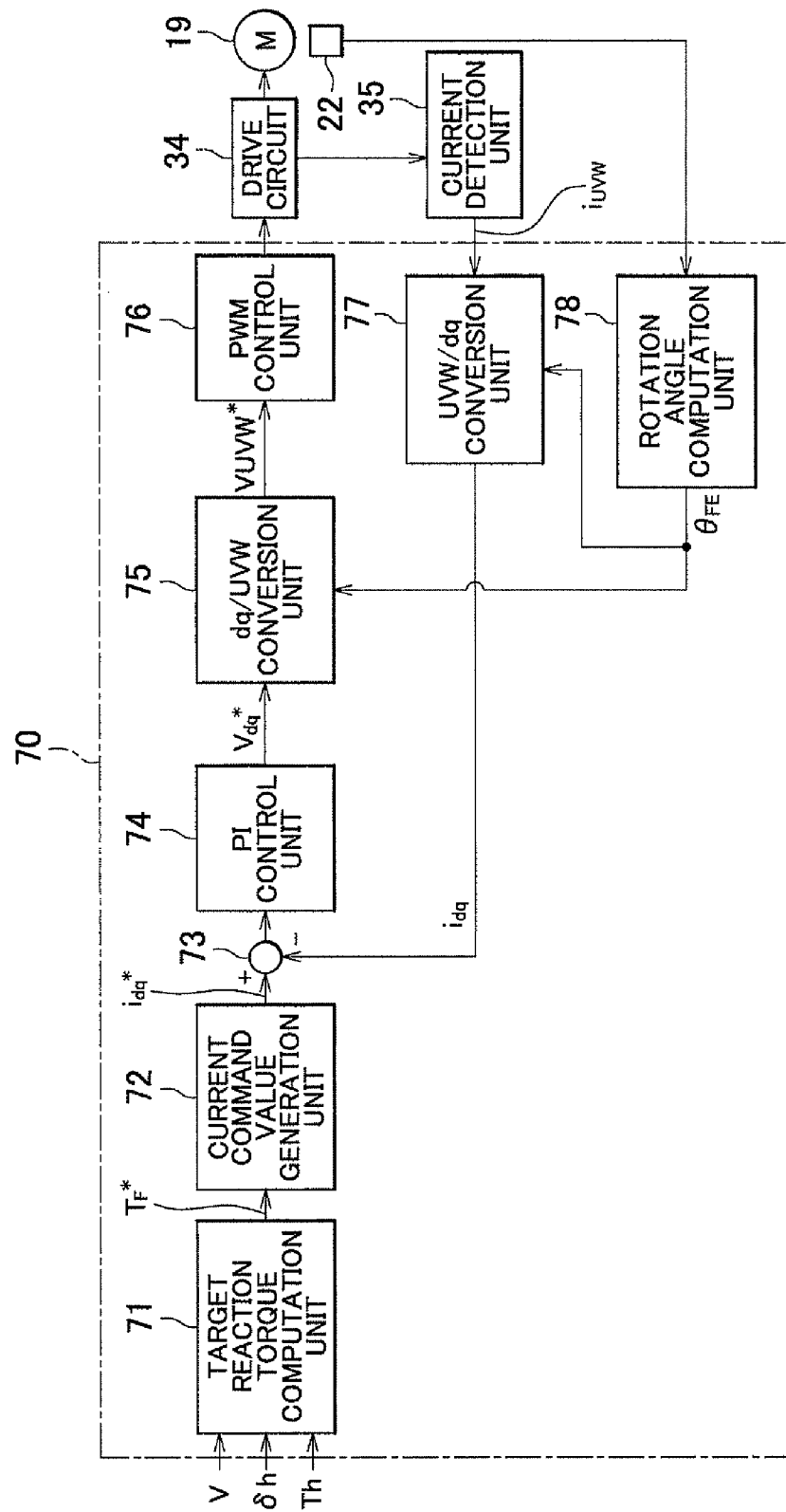
FIG. 7 is a block diagram that shows the configuration of a reaction motor control unit.

FIG. 7 is a block diagram that shows the configuration of the reaction motor control unit 70. The reaction motor control unit 70 includes a target reaction torque computation unit 71, a current command value generation unit 72, a current deviation computation unit 73, a proportional-integral (PI) control unit 74, a dq/UVW conversion unit 75, a PWM control unit 76, a UVW/dq conversion unit 77 and a rotation angle computation unit 78. The rotation angle computation unit 78 computes the rotation angle (electric angle; hereinafter, referred to as "rotor angle $\theta_{FE}$") of the rotor of the reaction motor 19 on the basis of the signal output from the rotation angle sensor 22.

The target reaction torque computation unit 71 computes a target reaction torque $T_F{}^*$ on the basis of the vehicle speed V detected by the speed sensor 14, the steering angle $\delta h$ detected by the angle sensor 11 and the steering torque Th detected by the torque sensor 12. For example, the target reaction torque computation unit 71 computes the target reaction torque $T_F{}^*$ by obtaining a target reaction torque basic value on the basis of the steering angle $\delta h$ and the vehicle speed V and then multiplying the target reaction torque basic value by a gain corresponding to the steering torque Th.

The current command value generation unit 72 generates values of currents that should be supplied to coordinate axes of the dq coordinate system, as current command values, on the basis of the target reaction torque $T_F{}^*$ computed by the target reaction torque computation unit 71. Specifically, the current command value generation unit 72 generates a d-axis current command value $i_d{}^*$ and a q-axis current command value $i_q{}^*$ (hereinafter, collectively referred to as "two-phase current command values $i_{dq}{}^*$" where appropriate). The current command value generation unit 72 sets the q-axis current command value $i_q{}^*$ to a significant value, and sets the d-axis current command value $i_{dq}{}^*$ to zero. The current command value generation unit 72 generates the q-axis current command value $i_q{}^*$ on the basis of the target reaction torque $T_F{}^*$ computed by the target reaction torque computation unit 71. The two-phase current command values $i_{dq}{}^*$ generated by the current command value generation unit 72 are provided to the current deviation computation unit 73.

The current detection unit 35 detects a U-phase current $i_U$, V-phase current $i_V$ and W-phase current $i_W$ (hereinafter, collectively referred to as "three-phase detected currents $i_{UVW}$" where appropriate) of the reaction motor 19. The three-phase detected currents $i_{UVW}$ detected by the current detection unit 35 are provided to the UVW/dq conversion unit 77. The UVW/dq conversion unit 77 converts the three-phase detected currents $i_{UVW}$ (U-phase current $i_U$, V-phase current $i_V$ and W-phase current $i_W$) of the UVW coordinate system, detected by the current detection unit 35, into the two-phase detected currents $i_d$ and $i_q$ (hereinafter, collectively referred to as "two-phase detected currents $i_{dq}$" where appropriate) of the dq coordinate system. The two-phase detected currents $i_{dq}$ are transmitted to the current deviation computation unit 73. The rotor angle $\theta_{FE}$ computed by the rotation angle computation unit 78 is used for coordinate conversion executed by the UVW/dq conversion unit 77.

The current deviation computation unit 73 computes a deviation between the two-phase current command values $i_{dq}{}^*$ generated by the current command value generation unit 72 and the two-phase detected currents $i_{dq}$ provided from the UVW/dq conversion unit 77. The current deviation computation unit 73 computes a deviation of the d-axis detected current $i_d$ from the d-axis current command value $i_d{}^*$ and a deviation of the q-axis detected current $i_q$ from the q-axis current command value $i_q{}^*$. The deviations are provided to the PI control unit 74.

The PI control unit 74 generates two-phase voltage command values $v_{dq}{}^*$ (a d-axis voltage command value $v_d{}^*$ and a q-axis voltage command value $v_q{}^*$), which are values of voltages that should be applied to the reaction motor 19, by executing PI computation on the current deviations computed by the current deviation computation unit 73. The two-phase voltage command values $v_{dq}{}^*$ are provided to the dq/UVW conversion unit 75. The dq/UVW conversion unit 75 converts the two-phase voltage command values $v_{dq}{}^*$ into three-phase voltage command values $v_{UVW}{}^*$. The rotor angle $\theta_{FE}$ computed by the rotation angle computation unit 78 is used for the coordinate conversion. The three-phase voltage command values $v_{UVW}{}^*$ are formed of a U-phase voltage command value $v_U{}^*$, a V-phase voltage command value $v_V{}^*$ and a W-phase voltage command value $v_W{}^*$. The three-phase voltage command values $v_{UVW}{}^*$ are provided to the PWM control unit 76.

The PWM control unit 76 generates a U-phase PWM control signal, a V-phase PWM control signal and a W-phase PWM control signal having duty ratios respectively corresponding to the U-phase voltage command value $v_U{}^*$, the V-phase voltage command value $v_V{}^*$ and the W-phase voltage command value $v_W{}^*$, and supplies the U-phase PWM control signal, the V-phase PWM control signal and the W-phase PWM control signal to the drive circuit 34. The drive circuit 34 is formed of a three-phase (corresponding to a U-phase, a V-phase and a W-phase) inverter circuit. Power elements that constitute the inverter circuit are controlled by the PWM control signals provided from the PWM control unit 76. Thus, voltages corresponding to the three-phase voltage command values $v_{UVW}{}^*$ are applied to the respective phase stator coils of the reaction motor 19.

The current deviation computation unit 73 and the PI control unit 74 constitute a current feedback controller. Due to the function of the current feedback controller, motor currents that flow through the reaction motor 19 are controlled so as to approach the two-phase current command values $i_{dq}{}^*$ generated by the current command value generation unit 72.

The embodiment of the invention is described above. However, the invention may be implemented in various other embodiment. For example, in the above-described embodiment, when a sensor malfunction has not been detected by the sensor malfunction determination unit 57, the rotation maintaining command signal generation unit 56 sets the amplitude control value K (V) to zero. Alternatively, even when a sensor malfunction has not been detected, the rotation maintaining command signal generation unit 56 may set the amplitude control value K (V) to a significant value other than zero as in the above-described case where a sensor malfunction has been detected. In this case, in the first control mode as well, the target rotor angle $\theta_{SM1}^*$ obtained by superimposing the rotation maintaining command signal calculated on the basis of the vehicle speed V, on the target rotor angle $\theta_{SM}^*$ computed by the target rotor angle computation unit 41 is used as a final target rotor angle.

In the above-described embodiment, the amplitude control value K(V) and the frequency control value α(V) are changed on the basis of the vehicle speed. Alternatively, the amplitude control value K(V) and the frequency control value α(V) may be changed on the basis of a road surface condition, a place where the vehicle is travelling, and the like. In addition, the rotation maintaining command signal may be an alternating-current signal (triangular-wave alternating-current signal, trapezoidal-wave alternating-current signal, or the like) other than the sinusoidal signal. In addition, the PI control units 44, 47 and 74 each may be a PID control unit that executes proportional-integral-derivative (PID) control.

What is claimed is:

1. A vehicle steering system in which an operating member that is operated for steering is not mechanically coupled to a steering mechanism and the steering mechanism is driven by a steered system motor formed of a brushless motor, the vehicle steering system comprising:

a rotation angle sensor configured to detect a rotation angle of a rotor of the steered system motor; and a processor programmed to:

estimate the rotation angle of the rotor of the steered system motor based on an induced voltage of the steered system motor;

compute a target rotor angle that is a target value of the rotation angle of the rotor of the steered system motor based on a steering state;

superimpose a rotation maintaining command signal for continuously rotating the steered system motor on the computed target rotor angle;

detect an occurrence of a malfunction of the rotation angle sensor; and in response to a detected malfunction of the rotation angle sensor, change a control mode from: a first control mode, in which the steered system motor is controlled based on the target rotor angle or the target rotor angle on which the rotation maintaining command signal has been superimposed by the processor and a value detected by the rotation angle sensor, to a second control mode, in which the steered system motor is controlled based on the target rotor angle on which the rotation maintaining command signal has been superimposed by the processor and the estimated rotation angle of the rotor.

2. The vehicle steering system according to claim 1, wherein the rotation maintaining command signal is an alternating-current signal.

3. The vehicle steering system according to claim 2, wherein the rotation maintaining command signal is a sinusoidal signal.

4. The vehicle steering system according to claim 3, wherein the processor is further programmed to:

change at least one of an amplitude and a frequency of the rotation maintaining command signal based on a travelling state of a vehicle.

5. The vehicle steering system according to claim 4, further comprising:

a speed sensor configured to detect a vehicle speed, wherein the processor is further programmed to change at least one of the amplitude and the frequency of the rotation maintaining command signal based on the vehicle speed detected by the speed sensor.

* * * * *